(12) United States Patent
Riback et al.

(10) Patent No.: US 6,258,266 B1
(45) Date of Patent: Jul. 10, 2001

(54) FAUCET MOUNT WATER FILTRATION DEVICE

(75) Inventors: Richard Riback, Deerfield; Mark Kurth; William Cowles, both of Chicago, all of IL (US)

(73) Assignee: Sta-Rite Industries, Inc., Delavan, WI (US)

( * ) Notice: Subject to any disclaimer, the term of this patent is extended or adjusted under 35 U.S.C. 154(b) by 0 days.

(21) Appl. No.: 09/295,560

(22) Filed: Apr. 21, 1999

(51) Int. Cl.[7] .................................................. B01D 35/02
(52) U.S. Cl. ........................ 210/234; 210/424; 210/449
(58) Field of Search ...................................... 210/282, 420, 210/421, 424, 449, 460, 422, 423, 234, 235

(56) References Cited

U.S. PATENT DOCUMENTS

| | | |
|---|---|---|
| D. 328,942 | 8/1992 | Igami et al. ........................ D23/209 |
| D. 398,369 | 9/1998 | Hayes et al. ........................ D23/209 |
| 4,172,796 * | 10/1979 | Corder .................................. 210/282 |
| 4,504,389 | 3/1985 | Rundzaitis ........................... 210/266 |
| 4,686,037 | 8/1987 | Long .................................... 210/221 |
| 5,151,179 * | 9/1992 | Bach et al. ........................... 210/282 |
| 5,192,436 | 3/1993 | Sasaki et al. ........................ 210/264 |
| 5,833,849 | 11/1998 | Primdahl ............................. 210/232 |
| 5,935,426 * | 8/1999 | Giordano et al. .................... 210/449 |
| 5,993,648 * | 11/1999 | Hunter et al. ........................ 210/460 |

* cited by examiner

Primary Examiner—Ivars Cintins
(74) Attorney, Agent, or Firm—Leydig, Voit & Mayer, Ltd.

(57) ABSTRACT

A water filter device mountable on a faucet facilitates water flow in substantially one linear direction through a filtering cartridge which comprises activated carbon or charcoal material. The water filtration device includes a valve assembly for selectively operating the filtering device for generating filtered or unfiltered water. The filtering device preferably includes a disc shaped filtering housing having a disc shaped filtering block of activated carbon material therein for filtering water. The present invention simplifies the flow path of water from the inlet through the filtering cartridge and provides for a more compact and lower profile filtering device which saves space in the sink associated with the water filtration device. It also provides for little or no pressure differential for flow through the filter.

11 Claims, 8 Drawing Sheets

FAUCET MOUNT WATER FILTRATION DEVICE

FIELD OF THE INVENTION

The present invention relates generally to water filters and more particularly to faucet mount water filtration devices that can be mounted directly on a faucet for filtering impurities from water flow.

BACKGROUND OF THE INVENTION

Tap water often includes impurities such as minerals, chlorine, particulates and other contaminants that effect the taste, odor, appearance and health quality of the water. To remove such impurities, water filtration devices are becoming increasingly utilized for filtering tap water. One approach utilized to filter impurities from water is to mount a water filtration device directly on the faucet. These faucet mount water filtration devices are often used in domestic applications such as in a kitchen sink or a bathroom sink for example. Faucet mount filtering devices have several advantages over other related types of water filtration devices that are not faucet mountable, such as under-the-sink water filtration devices which are stored in a cabinet. Such advantages of faucet mount filtration devices include low cost, ease of installation and the fact that hoses for communicating water to remote locations from the faucet are not necessary.

The common approach of prior faucet mount filtering devices includes the use of a tubular filtering cartridge disposed in a larger tubular filter housing. Unfiltered water surrounds the tubular filter cartridge and enters the filter cartridge from the cylindrical peripheral and flows radially inward to the center of the filter cartridge. Filtered water in center of the tubular filter cartridge is then discharged out an outlet for filtered water. The filter cartridge usually contains activated carbon material such as activated charcoal and is typically replaceable, being replaced after the filtering capacity is used up. To maximize the life span of the removable filter cartridge, faucet mount filtering devices also commonly have a valve assembly that allows the user to selectively obtain either filtered or unfiltered water from the filtration device. Filtered water is often selectively used for drinking and cooking applications while unfiltered water is often selectively used for such applications as cleaning.

Although there are several advantages of faucet mount water filtration devices, one disadvantage of prior attempts at faucet mount water filtration devices is that they are bulky and therefore interfere with other operations in the sink, particularly where space in the sink is limited. Moreover, the bulkiness is not aesthetically pleasing and diminishes other aesthetic features that are often specially designed into the sink or the faucet.

SUMMARY OF THE INVENTION

It is therefore the general object of the present invention to overcome these and other problems and deficiencies existing in the art of faucet mount water filtration devices.

It is another object of the present invention to provide a more compact or lower profile faucet mount water filtration device.

It is another object of the present invention to provide a faucet mount water filtration device that maximizes the amount of filtering material for a given size of filter housing.

It is a related object of the present invention to provide a faucet mount water filtration device in which the flow through the filtering cartridge is more direct and simple. In this connection, it is another objection of the invention to minimize any pressure differential of flow into and through the filter.

It is yet another object to provide a novel sealing means for precluding flow through the filter device passage when the cartridge is removed.

In accordance with one aspect of the present invention, there is provided a faucet mount water filtration device that provides for flow of water in substantially one linear direction through a filter cartridge therein. The water filtration device includes a valve assembly having an inlet connectable to the faucet and a first outlet for discharging unfiltered water. The valve assembly can be operated in a first position connecting the inlet to the first outlet for generating unfiltered water and a second position directing water flow through the filtering cartridge for generating filtered water. The filtering cartridge is disposed in a housing between a collection chamber for unfiltered water and a collection chamber for filtered water. The filtering device facilitates water flow through the filter cartridge in substantially one linear direction from the unfiltered collection chamber to the filtered chamber. A second outlet is fluidically connected to the second collection chamber for discharging filtered water.

According to the preferred embodiment, the filter cartridge is a generally disc shaped block comprising activated carbon material. The disc shaped block has an outer peripheral annular edge that is in close proximity to the filter housing and first and second opposing side faces in direct fluid communication with the filtered and unfiltered collection chambers, respectively. With the block or disc shaped filter as used herein, there is little if any pressure differential in passage through the filter as there is no reduction in the inlet passage through the filter. The water filtration device preferably includes a water barrier such as annular lips in the filter housing that engage the side faces of the filter cartridge to operate as approximate seals. The water barriers or lips prevent most flow of water between the outer annular peripheral edge of the filtering block and the housing so that the vast majority of water flows in one direction directly through the filtering block from the first face to the second face.

In accordance with another aspect of the present invention, a water filtration device includes a valve assembly that is movable between two positions for selectively generating filtered and unfiltered water. The valve assembly includes a first outlet for discharging unfiltered water. The water filtration device includes a filter housing comprising first and second plates and a side wall disposed transversely between the plates. The first plate is connected to the valve assembly and has an opening that is selectively connected to the inlet through a bypass for receiving unfiltered water. The second plate provides a second outlet for discharging filtered water. The disc shaped filtering block is disposed in the filtering housing between the first and second plates.

It is an advantage that the disclosed embodiment of the present invention provides for a faucet mount water filtration device that has more compact lower profile than prior art filtering devices. Another advantage of the disclosed embodiment is that more direct and simpler flow of water through a filtering block is accomplished in substantially one linear direction, thereby eliminating the need for radially inward flow from the cylindrical periphery of a filtering tube as is common in other prior attempts. The flow paths also ensure uniform water flow through the filtering cartridge so that the filtering capacity of the filtering cartridge is uniformly and efficiently utilized. The disc shaped filtering block of the disclosed embodiment leaves little void space in the filtering housing and thereby advantageously increases the amount of filtering media for the given size of the filter housing. The filtering block may be thicker than tubular filter cartridges which results in more effective filtering of water and reduces the frequency at which the filtering element needs replacing.

These and other aims, objectives, and features of the invention will become more apparent from the following detailed description when taken in conjunction with the accompanying drawings.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 1:
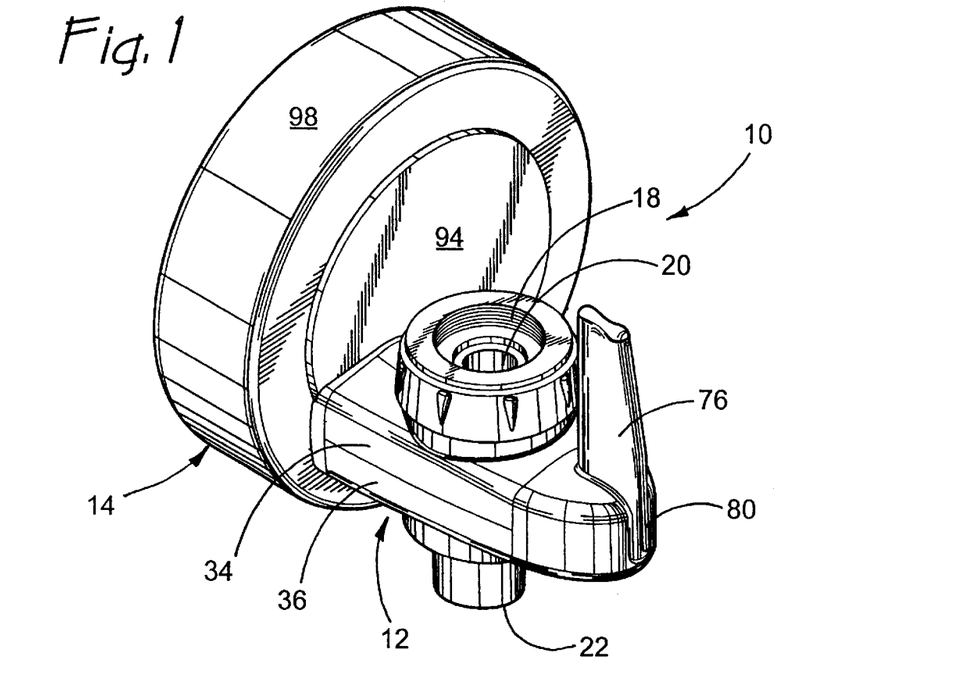
FIGS. 1 and 2 are a perspective view of a faucet mount water filtration device according to a preferred embodiment of the present invention.
Figure 2:
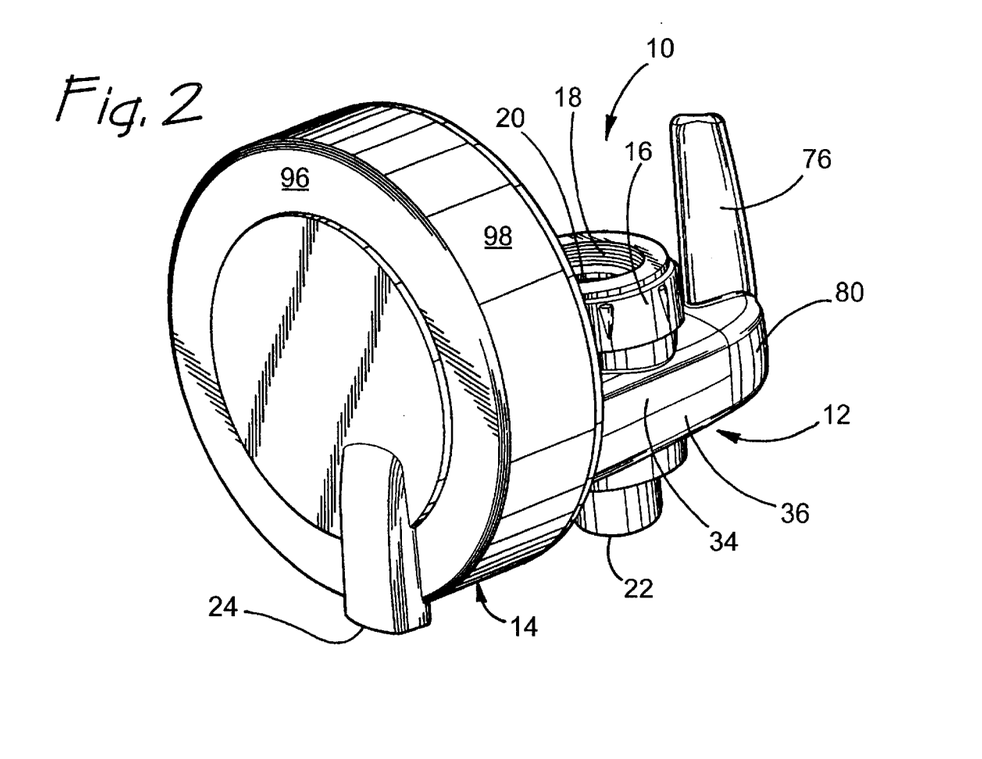
Figure 3:
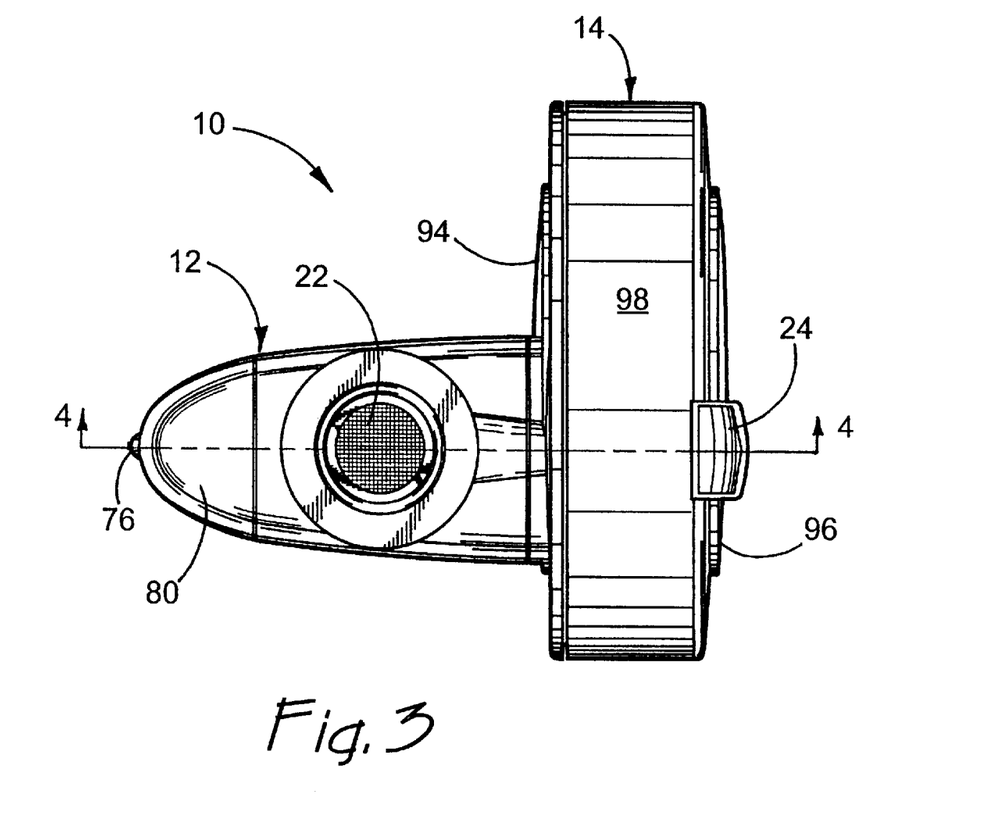
FIG. 3 is a bottom view of the faucet mount water filtration device of FIGS. 1 and 2.

For purpose of illustration and turning to FIGS. 1 and 2, a preferred embodiment of the present invention is illustrated as a faucet mount water filtration device 10. The filtration device 10 includes a valve assembly 12 secured to a filter assembly 14. A collar 16 having a threaded internal opening 18 is rotatably mounted on the valve assembly 12 and can screwed onto the discharge end of various types of conventional faucets (not shown) to thereby mount the filtration device 10 directly on a faucet (not shown) for support thereby. The valve assembly 12 provides an inlet 20 through the collar 16 for receiving unfiltered water and an unfiltered water outlet 22 for discharging unfiltered water. The filter assembly 14 provides a filtered water outlet 24 for discharging filtered water. As is generally shown in FIG. 4, the inlet 20 and the outlets 22, 24 are preferably aligned for receiving or discharging water along a vertical axis 26.

Figure 4:
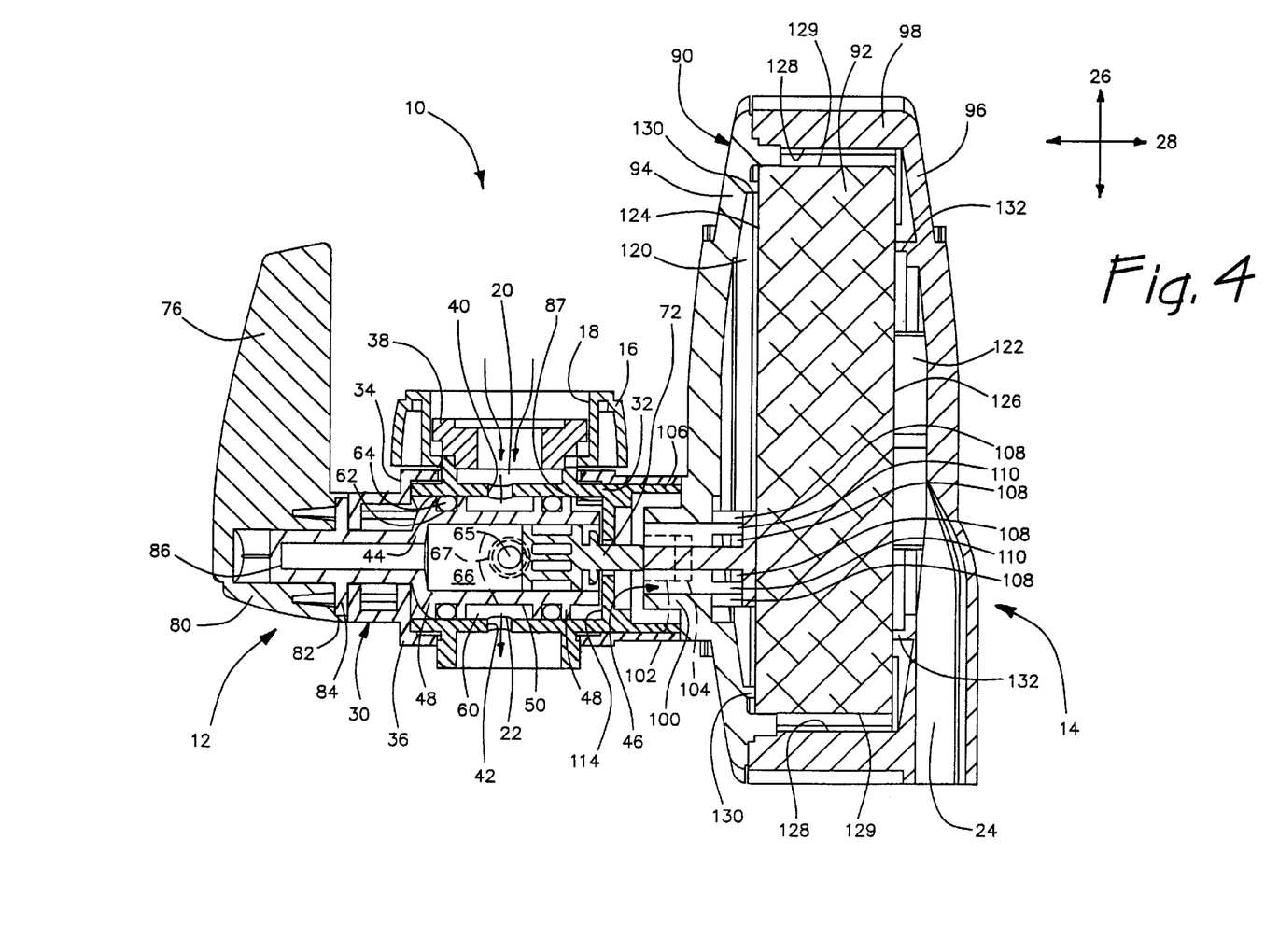
FIG. 4 is a cross-sectional view of FIG. 3 taken about line 4—4, with the valve assembly in a position for generating unfiltered water flow.

Referring to FIG. 4 of the preferred embodiment, the valve assembly 12 includes an outer housing assemblage 30 that comprises a generally cylindrical or sleeve-shaped diverter housing 32 fixed between upper and lower outer shells 34, 36. An annular retainer 38 secures the mounting collar 16 to the diverter housing 32 while accommodating the inlet 20 and allowing for rotation of the collar 16. The diverter housing 32 includes first and second apertures 40, 42 for communicating water between the inside of the diverter housing 32, the inlet 20 and the unfiltered water outlet 22.

Figure 5:
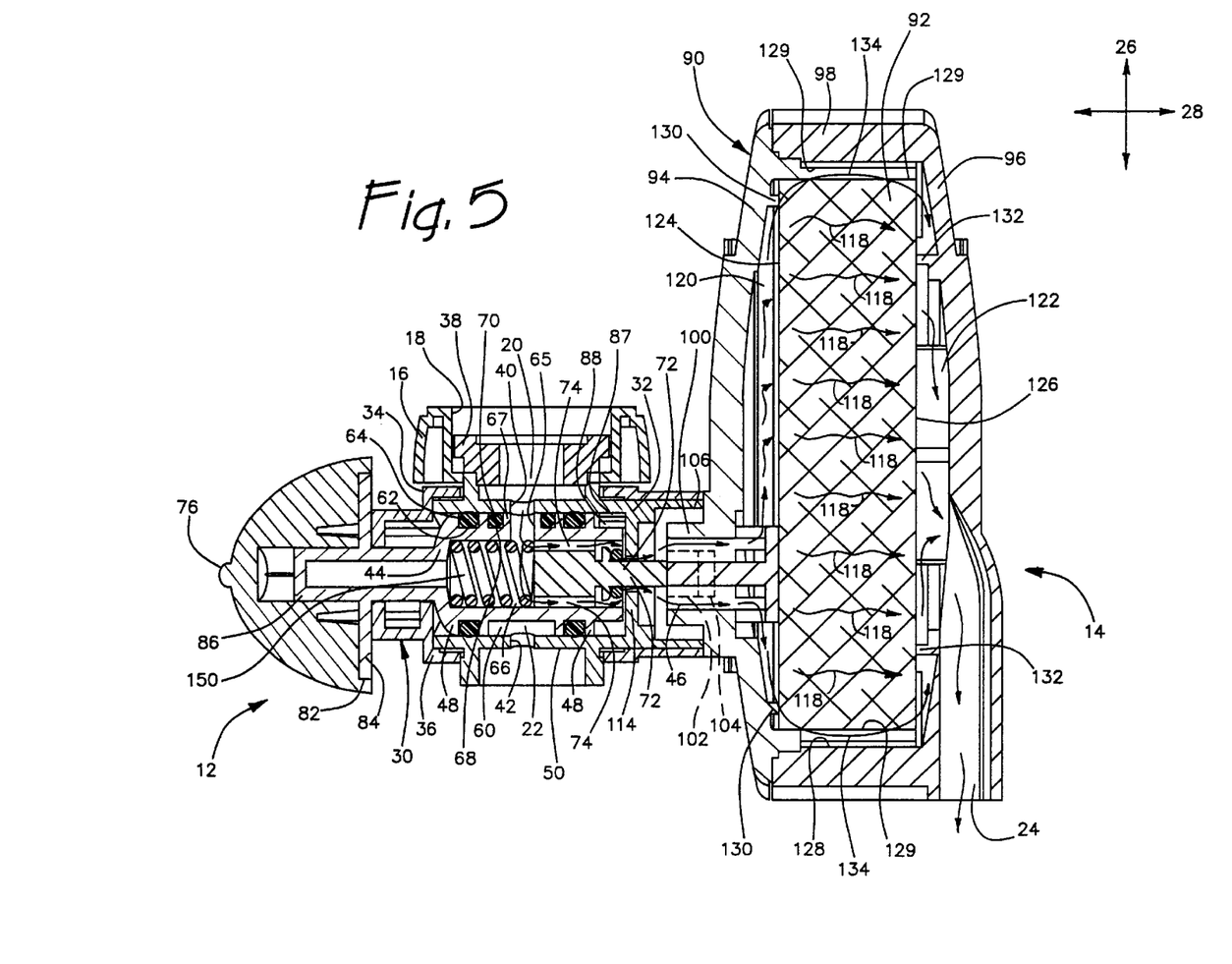
FIG. 5 is the same view as FIG. 4 but with the valve assembly in an alternate position for generating filtered water flow.

A generally cylindrical valve spool 44 is mounted for rotation inside the diverter housing 32 for selecting diverting water flow through a bypass, generally indicated at 46, towards the filter assembly 14. The valve spool 44 includes two enlarged diameter portions 48 closely fitted in the diverter housing 32 and a smaller diameter portion 50 therebetween. The smaller diameter portion 50 provides for an annular chamber 60 formed between the outer periphery of the spool 44 and the inner periphery of the diverter housing 32. Each of the enlarged portions 48 have an annular groove 62 with a resilient O-ring gasket 64 seated therein for preventing leakage. Referring to FIG. 5 in which the spool 44 is rotated 90°, the spool 44 also includes a raised projection 67 on the smaller diameter portion 50 that is also closely fit within the diverter housing 32. The smaller diameter portion 57 includes a central opening 65 that can be diametrically aligned with inlet aperture 40 as shown in FIG. 5 for communicating water from the inlet 20 to a bypass chamber 66 inside the spool 44. The projection 67 may include an annular groove 68 with seal material 70 therein for preventing water from leaking out to the annular chamber 60 when the central opening 65 is diametrically aligned with inlet aperture 40. Disposed with in the bypass chamber 66 may be a valve insert 72 for directing flow along the bypass 46. As shown in FIG. 5 in which the valve insert 72 is also rotated 90°, the valve insert 72 includes axially extending passages 74 for communicating water flow through the bypass 46.

In comparing FIGS. 4 and 5, it is seen the valve spool 44 can be rotated between two positions for generating unfiltered water and filtered water. To control the valve spool position, a control lever 76 is fixed to the end portion 86 of the valve spool 44 so that the lever 76 and spool 44 pivot in unison relative to the diverter housing 32. In viewing FIGS. 1, 4 and 5, it can be seen that the control lever 76 has a rectangular body portion 80 which includes a rectangular opening 82 closely receiving a rectangular projection 84 on the end portion 86 of the spool 44 to facilitate torque transfer therebetween. The diverter housing 32 and spool 44 may also include cooperating resilient guide shoulders 87, 88 or other locking mechanism for directing and holding the spool 44 in each of the two positions until force is again applied to the lever 76.

In the preferred embodiment, the filter assembly 14 comprises a hollow filter housing 90 having a filtering cartridge 92 disposed therein. The filter housing 90 comprises first and second slightly concave plate members 94, 96 that are snapped, threadably screwed or otherwise secured to one another in order to allow for insertion of replacement filtering cartridges.

One of the plate members 96 has integrally connected therewith an elongate, generally cylindrical side wall portion 98. The filter housing 90 also includes a neck portion 100 which is secured to the valve assembly 12 by any suitable mechanism such as a threaded connection for example. The preferred embodiment uses resilient cooperating shoulders 102, 104 (the shoulders shown in dashed lines in FIGS. 4 and 5 and the shoulders 102 on the neck portion 100 being shown separately in FIG. 9) on the diverter housing 32 and the neck portion 100, respectively, that are interfit with one another by inserting the neck 100 into a sleeve end 106 of the diverter housing 32 and then rotating the filter housing 90 with respect to the valve assembly 12 about 90° to lock the shoulders 102, 104.

The internal bypass 46 provides for fluid communication between the filter housing 90 and the valve assembly 12. In the preferred embodiment, the bypass 46 is generally aligned with the horizontal axis 28 and runs from the central opening 65, through the bypass chamber 66, the axial passages 74, an orifice 112 in an inward flange section 114 of the diverter housing 32, the hollow interior of the sleeve end 106 and into the hollow interior of the neck portion 100. The neck portion 100, includes a plurality of openings 108 between support ribs 110, to fluidically connect the bypass 46 with the hollow interior of the filter housing 90.

In operation, the valve assembly 12 is selectively operated to generated unfiltered or filtered water. In the position shown in FIG. 4, the valve assembly directs unfiltered water from the inlet 20 through the inlet aperture 40, the annular chamber 60, the outlet aperture 42 and discharges unfiltered water out the unfiltered outlet 22, the water flow being illustrated by water flow lines. In the position shown in FIG. 5, the valve assembly directs unfiltered water from the inlet 20, through the inlet aperture 40, the central opening 65, the bypass 46, the filtering cartridge 92, and results in filtered water discharging out the filtered water outlet 24, as generally shown by water flow lines.

In accordance with an aspect of the present invention, the filtering assembly 14 facilitates water flow through the filtering cartridge in substantially one linear direction as illustrated by water flow lines 118 in FIG. 5. In the preferred embodiment one directional flow is accomplished by providing a filtering cartridge 92 that is a generally disc shaped block with opposed side faces 126, 124 joined by an outer peripheral annular edge 129. The filter cartridge 92 includes activated carbon material or other suitable filtering media for filtering impurities from water. The filtering cartridge 92 may also include screen material in addition to carbon material to separate larger particles. The disc shaped filtering block or cartridge 92 divides the hollow interior of the filter housing 90 into an unfiltered water collection chamber 120 and a filtered water collection chamber 122. The unfiltered water collection chamber 120 is generally disposed between the first side face 124 of the filtering cartridge 92 and the housing plate 94. The filtered water collection chamber 122 is generally disposed between the opposed side face 126 of the filtering cartridge 92 and the other housing plate 96 and is fluidically connected to the outlet 24. The filtered water outlet 24 which is preferably integrally formed with the housing plate 96. As shown in FIGS. 4 and 5, the opposed side faces 124, 126 are preferably radially planar, parallel and solid such that there is little void space in the filter housing 90. This increases the amount of filtering material for the given size of housing 90 which extends the life span of the filtering cartridge, provides for more effective water filtering and reduces the frequency at which the filtering cartridge needs replacing. Also, the pressure differential between inlet and outlet is minimized or eliminated.

In the preferred embodiment, the vast majority of water flow through the filter cartridge 92 is facilitated in substantially one direction, preferably along a horizontal axis 28 that is perpendicular to the vertical axis 26. To prevent most water from seeping along the inside periphery 128 of the side wall 98, both housing plates 94, 96 preferably include water barriers such as annular lips 130, 132. The annular lips 130, 132 contact or engage the filtering cartridge 92 to prevent or minimize the amount of water that passes between the inner periphery 128 of the side wall 98 and the annular peripheral edge 129 of the filter cartridge 92 unfiltered. Although the vast majority of the flow is in one direction as indicated by flow lines 118, some water flow may seep in a slightly less straight pattern along the inner periphery of the side wall 98 and filter housing 90 as indicated by outer water flow lines 134 in FIG. 5. The annular lips 130, 132 also ensure that substantially all water flows through the filtering cartridge 92 along outer flow lines 134. Alternatively, sealing material or a glue can be used to further enhance the barrier.

Figure 6:
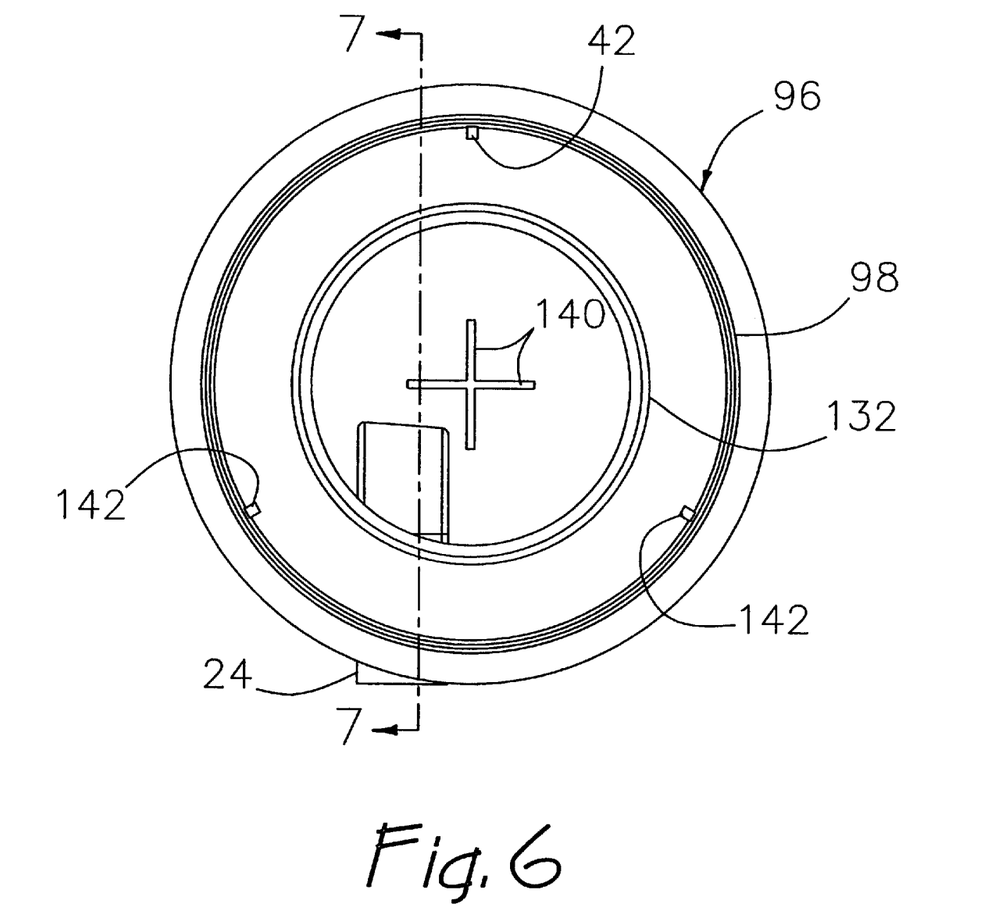
FIG. 6 is a side view of a part of the filter housing.
Figure 7:
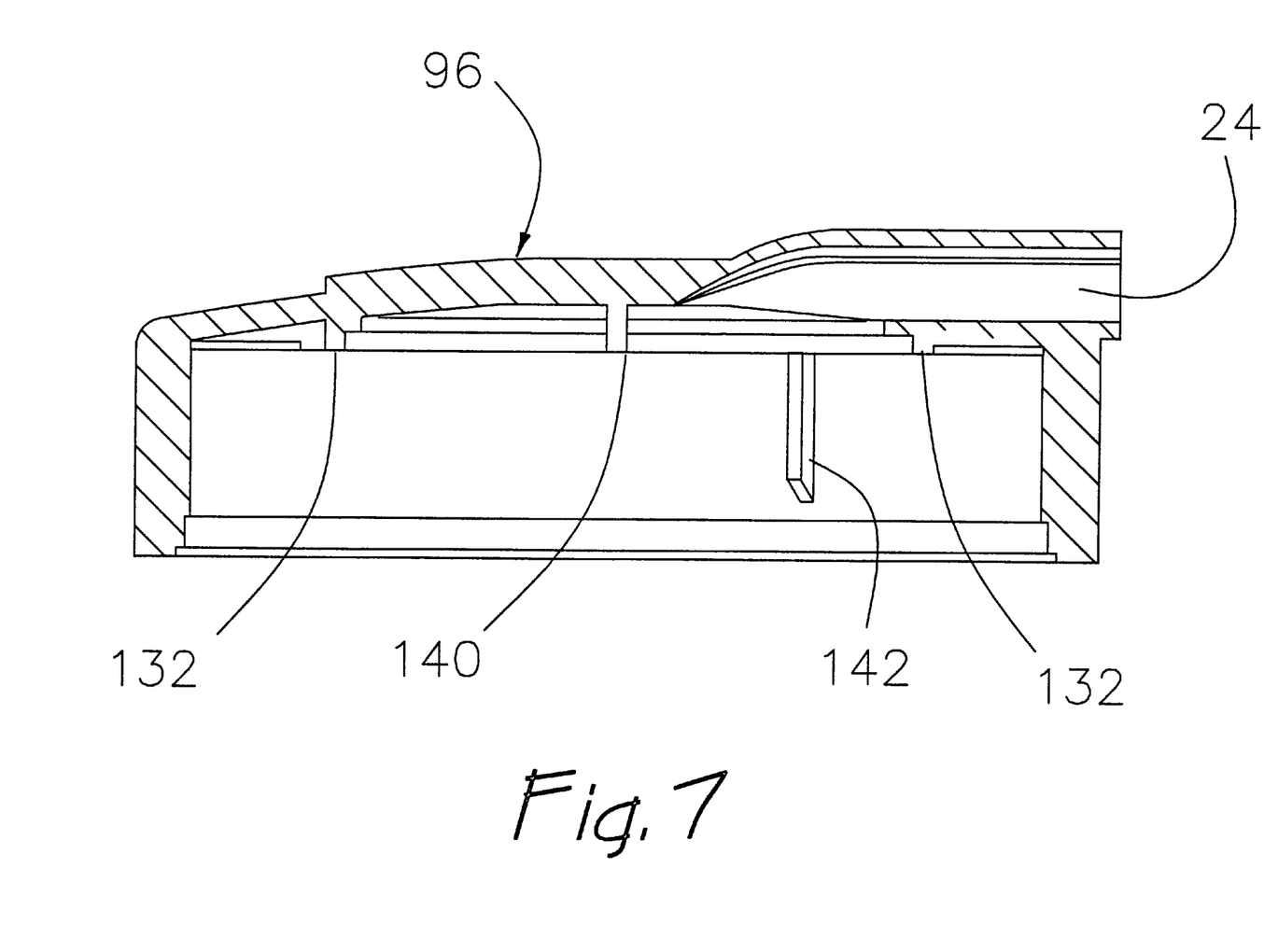
FIG. 7 is a cross-sectional view of FIG. 6 taken about line 7—7.
Figure 8:
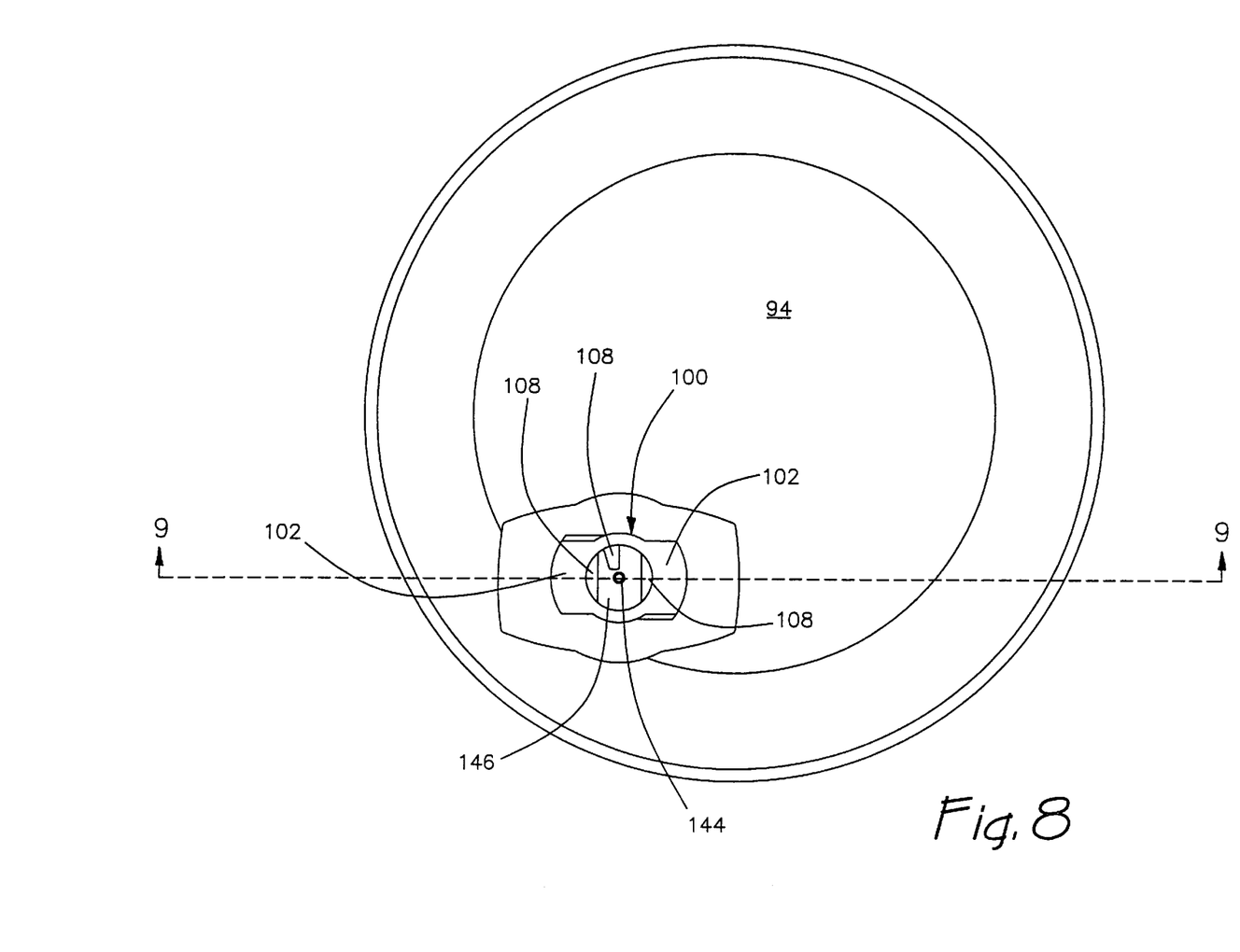
FIG. 8 is a side view of a part of the filter housing.
Figure 9:
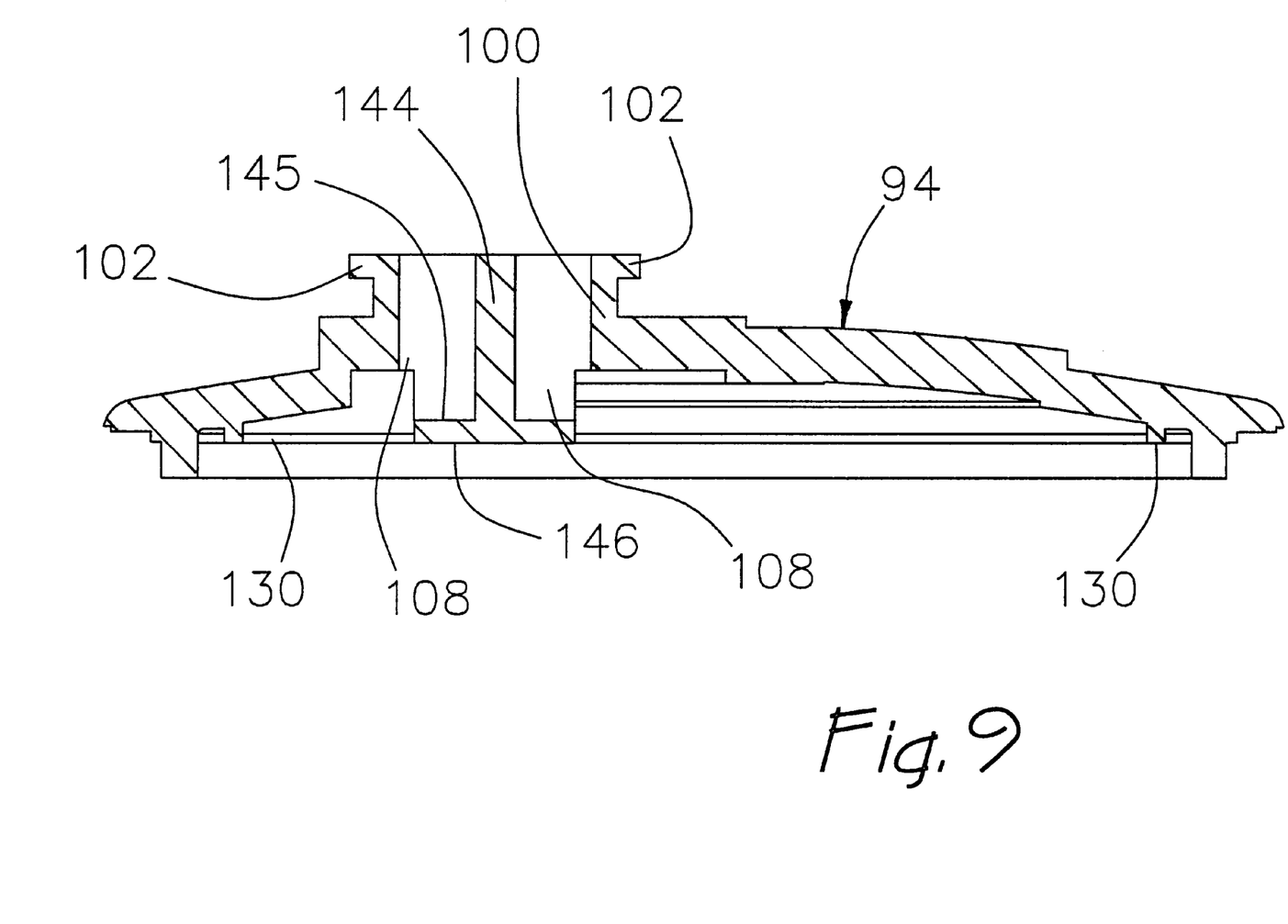
FIG. 9 is a cross-sectional view of FIG. 8 taken about line 9—9.

Referring to FIG. 6, the plate member 96 which includes the side wall 98, has an axially extending support cross 140 for supporting and axially positioning the planar side face 126 of the filtering cartridge 92 (FIG. 4). As shown in FIG. 7, the support cross 140 is aligned about parallel with the annular lip 132 so as not to interfere with the sealing capabilities of the lip 132. Referring to FIGS. 6 and 7, the side wall 98 also provides axially extending support and positioning ridges 142 which may closely receive corresponding notches (not shown) in the peripheral edge 129 of the filtering cartridge 92. Referring to FIGS. 8 and 9, the other plate member 94 includes an inner stem portion 144 connected by ribs to the neck portion 100. The stem portion 144 has a radially extending flange 145 which helps direct water radially outward into the unfiltered collection chamber 120 during operation. The internal face 146 of the flange 145 helps position the filtering cartridge 96 axially and is aligned about parallel with the annular lip 132 so as not to interfere with the sealing capabilities of the annular lip 132.

Another feature that may be present is the provision of spring biased valve means that closes off the passage of water to the filtration assembly area or the filtration outlet 24 when the filtering cartridge is removed. To this end, a spring 150, as best shown in FIG. 5, normally urges the valve spool 44 outwardly. When the filtering cartridge 96 is in place, it positions the plunger inwardly so flow can occur. However, when the cartridge is removed, flow is prevented from occurring in the filtered water collection chamber.

Thus, there has been provided a Faucet Mount Water Filtration Device which fully satisfies the objects, aims, and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations that fall within the spirit and broad scope of the appended claims.

What is claimed is:

1. A faucet mount water filtration device mountable on a faucet or generating filtered and unfiltered water, comprising:

a valve assembly having an inlet connectable to the faucet, a first outlet for unfiltered water, and a bypass, the valve assembly including a first position fluidically connecting the inlet to the first outlet and a second position fluidically connecting the inlet to the bypass;

a filter housing having first and second collection chambers for unfiltered and filtered water, the first collection chamber fluidically connected to the bypass for receiving unfiltered water, the second chamber fluidically connected to a second outlet for discharging filtered water;

a filter cartridge disposed in the filter housing between the first and second collection chambers in a position to facilitate water flow through the filter cartridge in one substantially linear direction from the first to the second collection chamber, said filter cartridge being a disc-shaped block comprising activated carbon material and having first and second opposed side faces and an outer peripheral edge joining the faces, and said flow through the filter cartridge being from said first side face through to and out of said second side face.

2. The faucet mount water filtration device of claim 1 wherein the filter housing comprises first and second plates, and a side wall disposed transversely between the plates, the first plate connected to the valve assembly and having an opening in fluid communication with the bypass for receiving unfiltered water, the second plate providing the second outlet for discharging filtered water.

3. The faucet mount water filtration device of claim 1 wherein the filter assembly has a vertical axis and a horizontal axis perpendicular to the vertical axis, the filter assembly adapted to receive and discharge water flow through the inlet and the outlets along the vertical axis and transmitting water flow through the bypass and through the filter cartridge along the horizontal axis.

4. The faucet mount water filtration device of claim 1 further comprising a water barrier adapted to limit water flow along the outside of the outer peripheral edge.

5. The faucet mount water filtration device of claim 1 further comprising a biasing means for urging the valve assembly to a closed position when the filter cartridge is removed and permitting the opening of the flow to the second collection chamber when the filter cartridge is in place.

6. The faucet mount water filtration device of claim 1 wherein the valve assembly includes a valve housing secured to the filter housing, a valve spool mounted for rotation in the valve housing, and a control lever coupled to the valve spool, the valve housing providing the inlet and the unfiltered water outlet, the control lever movable to pivot the valve spool from the first to the second position for selectively flowing water through the bypass.

7. A faucet mount water filtration device mountable on a faucet for generating filtered and unfiltered water, comprising:

a valve assembly having an inlet connectable to the faucet, a first outlet for discharging unfiltered water, and a bypass, the valve assembly including a first position fluidically connecting the inlet to the first outlet and a second position fluidically connecting the inlet to the bypass;

a filter housing comprising first and second plates, and a side wall disposed transversely between the plates, the first plate connected to the valve assembly and having an opening in fluid communication with the bypass for receiving unfiltered water, the second plate having a second outlet for discharging filtered water;

a disc-shaped filtering block disposed in the filter housing between the first and second plates, said filtering block having a first and second opposed sides joined by a peripheral edge, the combination of the first side and first plate forming a collection chamber for unfiltered water, the combination of the second side and the second plate forming a collection chamber for filtered water whereby water flow is facilitated through the filtering cartridge in substantially one linear direction from the first to the second collection chamber, said filtering block having first and second end faces and a outer peripheral edge joining the faces, said filter housing including a water barrier adapted to limit water flow between the side walls at the outer peripheral edge of the filtering block, and said water barrier comprises an annular lip on at least one of the plates, the annular lip having a diameter that is less than that of the filtering block and engaging the filtering block.

8. The faucet mount water filtration device of claim 7 wherein the second plate integrally defines the second outlet.

9. The faucet mount water filtration device of claim 7 wherein the side wall is integrally connected to the second plate.

10. The faucet mount water filtration device of claim 7 further comprising a collar mounted for rotation on the valve assembly and having a threaded opening for connection to a faucet.

11. The faucet mount water filtration device of claim 7 wherein the valve assembly includes a valve housing secured to the filter housing, a valve spool mounted for rotation in the valve housing, and a control lever coupled to the valve spool, the valve housing providing the inlet and the unfiltered water outlet, the control lever movable to pivot the valve spool from the first to the second position for selectively flowing water through the bypass.

* * * * *